United States Patent
Rogers et al.

(10) Patent No.: US 9,218,466 B2
(45) Date of Patent: *Dec. 22, 2015

(54) SYSTEMS AND METHODS FOR DETECTING COPIED COMPUTER CODE USING FINGERPRINTS

(71) Applicant: Terbium Labs LLC, Baltimore, MD (US)

(72) Inventors: Daniel Jordan Rogers, Baltimore, MD (US); Michael Alan Moore, Columbia, MD (US)

(73) Assignee: TERBIUM LABS LLC, Baltimore, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 14/621,554

(22) Filed: Feb. 13, 2015

(65) Prior Publication Data

US 2015/0278490 A1 Oct. 1, 2015

Related U.S. Application Data

(63) Continuation of application No. 14/314,407, filed on Jun. 25, 2014, now Pat. No. 8,997,256.

(60) Provisional application No. 61/973,125, filed on Mar. 31, 2014.

(51) Int. Cl.
| | |
|---|---|
| G06F 21/16 | (2013.01) |
| G06F 21/12 | (2013.01) |
| G06F 9/44 | (2006.01) |

(52) U.S. Cl.
CPC ............... G06F 21/12 (2013.01); G06F 8/751 (2013.01); G06F 21/16 (2013.01); G06F 2221/0737 (2013.01)

(58) Field of Classification Search
None
See application file for complete search history.

(56) References Cited

U.S. PATENT DOCUMENTS

| | | | |
|---|---|---|---|
| 5,559,884 | A | 9/1996 | Davidson et al. |
| 6,000,030 | A | 12/1999 | Steinberg et al. |
| 6,108,420 | A | 8/2000 | Larose et al. |
| 6,591,415 | B1 | 7/2003 | Torrubia-Saez |
| 6,668,325 | B1 | 12/2003 | Collberg et al. |
| 7,424,131 | B2 | 9/2008 | Allatar et al. |
| 7,581,092 | B2 | 8/2009 | Shear et al. |

(Continued)

FOREIGN PATENT DOCUMENTS

CN 102012862 A 4/2011

OTHER PUBLICATIONS

Arruda, Patrice, Pierre Chamoun, and Dwight Deugo. "A Framework for Detecting Code Piracy Using Class Structure." Proceedings 22$^{nd}$ International Conference on Software Engineering & Knowledge Engineering (SEKE). (2010): pp. 559-564.

(Continued)

Primary Examiner — David Pearson
(74) Attorney, Agent, or Firm — Patent Portfolio Builders PLLC

(57) ABSTRACT

Systems and methods of detecting copying of computer code or portions of computer code involve generating unique fingerprints from compiled computer binaries. The unique fingerprints are simplified representations of the compiled computer binaries and are compared with each other to identify similarities between the compiled computer binaries. Copying can be detected when there are sufficient similarities between at least portions of two compiled computer binaries.

26 Claims, 8 Drawing Sheets

(56) References Cited

U.S. PATENT DOCUMENTS

| | | | |
|---|---|---|---|
| 7,590,853 | B1 | 9/2009 | Shear et al. |
| 7,685,590 | B2 | 3/2010 | Venkatesan et al. |
| 7,734,553 | B2 | 6/2010 | Shear et al. |
| 7,761,916 | B2 | 7/2010 | Shear et al. |
| 7,770,016 | B2 | 8/2010 | Horne et al. |
| 7,904,707 | B2 | 3/2011 | Shear et al. |
| 7,925,898 | B2 | 4/2011 | Shear et al. |
| 8,056,138 | B2 | 11/2011 | Jin et al. |
| 8,140,850 | B2 | 3/2012 | Horne et al. |
| 8,214,497 | B2 | 7/2012 | Alperovitch et al. |
| 8,365,277 | B2 | 1/2013 | Kim et al. |
| 8,370,634 | B2 | 2/2013 | Horne et al. |
| 8,495,755 | B2 | 7/2013 | Jin et al. |
| 8,533,848 | B2 | 9/2013 | Jin et al. |
| 8,533,851 | B2 | 9/2013 | Ginter et al. |
| 8,566,960 | B2 | 10/2013 | Richardson |
| 8,661,559 | B2 | 2/2014 | Wilson et al. |
| 2005/0028002 | A1* | 2/2005 | Christodorescu ..... G06F 21/562 726/3 |
| 2006/0230453 | A1 | 10/2006 | Flynn et al. |
| 2007/0074287 | A1* | 3/2007 | Abad ............ G06F 21/562 726/22 |
| 2007/0239993 | A1 | 10/2007 | Sokolsky et al. |
| 2008/0288653 | A1 | 11/2008 | Adams |
| 2009/0172404 | A1 | 7/2009 | Kim et al. |
| 2009/0328185 | A1* | 12/2009 | Berg ............ H04L 63/0245 726/13 |
| 2010/0011441 | A1* | 1/2010 | Christodorescu ....... G06F 21/53 726/24 |
| 2011/0214188 | A1 | 9/2011 | Collberg et al. |
| 2014/0068768 | A1* | 3/2014 | Lospinuso ............ G06F 21/561 726/23 |
| 2015/0180883 | A1* | 6/2015 | Aktas ............ G06F 17/30 726/23 |
| 2015/0186648 | A1* | 7/2015 | Lakhotia ............ G06F 21/50 726/22 |

OTHER PUBLICATIONS

Bilar, Daniel. "Callgraph properties of executables." AI Communications 20.4 (2007): pp. 231-243.

Bruschi, Danilo, Lorenzo Martignoni, and Mattia Monga. "Using Code Normalization for Fighting Self-Mutating Malware." Proceedings of the International Symposium on Secure Software Engineering. 2006; pp. 1-8.

Cesare, Silvio, and Yang Xiang. "Classification of Malware Using Structured Control Flow." Proceedings of the Eighth Australasian Symposium on Parallel and Distributed Computing. vol. 107. Australian Computer Society, Inc. (2010): 61-70.

Collberg, Christian, and Clark Thomborson. "Software Watermarking: Models and Dynamic Embeddings." Proceedings of the 26th ACM SIGPLAN-SIGACT Symposium on Principles of Programming Languages. ACM, 1999; pp. 311-324.

Commission on the Theft of American Intellectual Property. "The IP Commission Report: The Report of the Theft of American Intellectual Property." (May 2013); 100 pages.

Dullien, Thomas, and Rolf Rolles. "Graph-based comparison of Executable Objects (English Version)." SSTIC 5 (2005): pp. 1-3.

Flake, Halvar. "Structural comparison of executable objects." In Flegel, U., and Michael Maier (eds.). "Detection of Intrusions and Malware & Vulnerability Assessment: GI Special Interest SIDAR Workshop." DIMVA, 2004; pp. 161-173.

Lim, Hyun-il, et al. "A method for detecting the theft of Java programs through analysis of the control flow information." Information and Software Technology 51.9 (2009): pp. 1338-1350.

Mandiant.com. "APT1: Exposing One of China's Cyber Espionage Units." (2013); 76 pages.

McAfee Labs and McAfee Foundstone Professional Services. "Protecting Your Critical Assets: Lessons Learned from 'Operation Aurora.'" (2010): pp. 1-15.

Myles, Ginger, and Christian Collberg. "Detecting Software Theft via Whole Program Path Birthmarks," Information Security. Springer-Verlag Berlin Heidelberg, 2004; pp. 404-415.

Rajaraman, Anand, and Jeffrey David Ullman. Mining of Massive Datasets. Cambridge University Press, 2012; 453 pages.

Robles-Kelly, Antonio, and Edwin R. Hancock. "Graph-Edit Distance from Spectral Seriation." IEEE Transactions on Pattern Analysis and Machine Intelligence, 27.3 (2005): pp. 365-378.

Verizon. "Verizon 2012 Data Breach Investigations Report." (2012); 80 pages.

Zaremski, Amy Moormann. Signature and Specification Matching. Diss. Massachusetts Institute of Technology, 1996; 150 pages.

Jianming, Fu et al., "Comparison of Executable Objects Based on Singatures and Properties,"Journal of Computer Research and Development, 2009, pp. 1868-1876, vol. 46, Issue 11, China Academic Journal Electronic Publishing House.

Xie, Xin et al., "A Static Software Birthmark Based on Use-Define Chains for Detecting the Theft of Java Programs," Security and Cryptography, 2011, pp. 231-237, Zhengzhou Information Science and Technology Institute, Henan, China.

Carrera et al. Digital Genome Mapping—Advanced Binary Malware Analysis Sep. 2004 Virus Bulletin Conference pp. 1-11.

International Search Report and Written Opinion of the International Searching Authority in corresponding International Application No. PCT/US15/22650 dated Jul. 7, 2015.

* cited by examiner

200

Bulk File Characteristics and Meta-Data
610

Function Coordinates
620 fun_1: (out-deg, blks, edges)
fun_2: (out-deg, blks, edges)
fun_3: (out-deg, blks, edges)
.
.

Unique Spectra
630 fun_3:
Block Size;

fun_2:
Block Size;

fun_1:
Block Size;
In-Degree;
Out-Degree

Fig. 6

SYSTEMS AND METHODS FOR DETECTING COPIED COMPUTER CODE USING FINGERPRINTS

CROSS REFERENCE TO RELATED APPLICATIONS

This application claims priority under 35 U.S.C. §120 to application Ser. No. 14/314,407, filed Jun. 25, 2014, and under 35 U.S.C. §119 to Provisional Application No. 61/973,125, filed Mar. 31, 2014, the entire disclosures of which are herein expressly incorporated by reference.

BACKGROUND OF THE INVENTION

Software theft has been, and continues to be, pervasive. Individuals and companies typically try various techniques to combat software theft, including requiring a unique software key to install software, requiring online activation of software, requiring an active online connection to use software, encryption of software, and the like. Although these techniques typically prevent casual users from installing unauthorized copies, the techniques can typically be overcome by sophisticated users.

Another way to combat software theft is to try to identify the source of the stolen software using watermarks. This involves applying unique watermarks to each copy of the software so that when a stolen piece of software is found, the watermark in the stolen software will corresponding to one of the unique watermarks in the authorized software. This requires modification of the computer code, which is undesirable. Further, this technique can be overcome by removing the watermark from the stolen software or removing the watermark from the authorized software so that all further copies do not contain the unique watermark.

SUMMARY OF THE INVENTION

In addition to the issues identified above with the known techniques for combating software theft, these techniques focus on the software as a whole, and thus cannot identify when only portions of the underlying code are stolen. For example, if a watermark is applied to the software, the watermark would not appear in the stolen software if less than the entire code were used. Similarly, if software theft were identified by comparing hash values generated from the authorized and stolen software, the hash values would not match when less than the entire underlying code is present in the stolen software. Thus, a thief could simply modify some portion of the code to defeat these techniques. Further, it is often the case that only a portion of the underlying code is truly unique and provides the overall value to the software, and accordingly a thief may only want to use this unique portion in different software.

Exemplary embodiments of the present invention are directed to techniques for combating software theft by identifying whether at least a portion of one piece of software appears in another piece of software. Thus, the present invention allows the identification of whether portions of one piece of software appear in a different piece of software, even when the overall operation of the two pieces of software is different. The inventive technique is particularly useful because it operates using compiled computer binaries, and thus does not require access to the underlying source code.

In accordance with exemplary embodiments of the present invention, fingerprints are generated using compiled computer binaries and the fingerprints are compared to determine whether there are sufficient similarities so as to indicate theft of at least a portion of one of the compiled computer binaries in the other compiled computer binary.

The fingerprints are generated by disassembling the compiled computer binaries and generating a control flow graph and function call graphs for each function in the control flow graph. Each function is then processed to identify unique spectra. These unique spectra are used to identify similarities between the different compiled computer binaries.

BRIEF DESCRIPTION OF THE DRAWINGS

FIG. 6 is a block diagram of an exemplary fingerprint in accordance with the present invention.

DETAILED DESCRIPTION OF THE DRAWINGS

Figure 1:
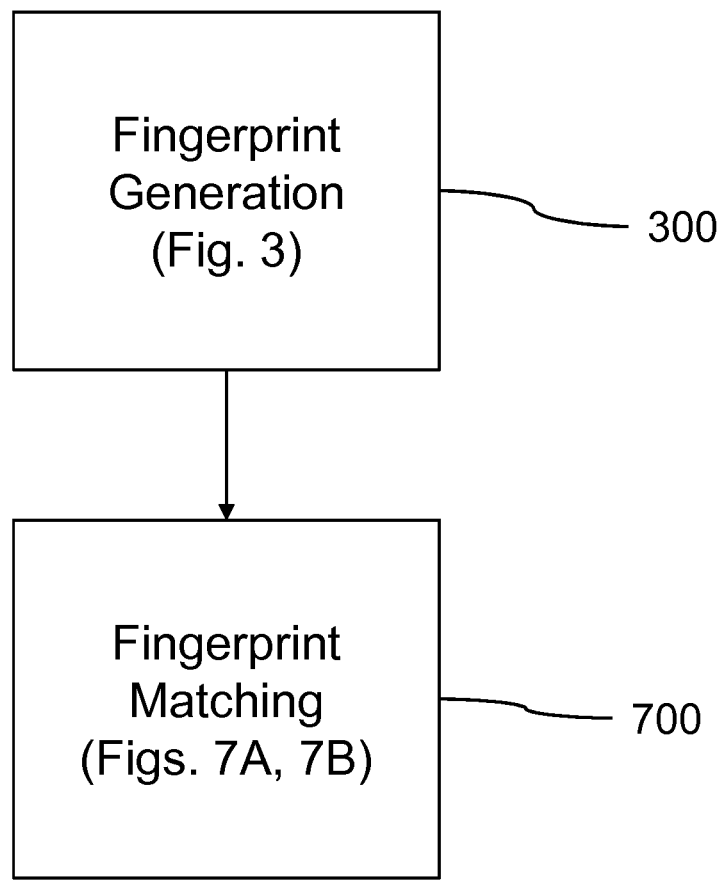
FIG. 1 is a flow diagram of the overall process of exemplary embodiments of the present invention.

FIG. 1 is a flow diagram of the overall process of exemplary embodiments of the present invention. As illustrated in FIG. 1, the overall process involves generating a fingerprint from compiled computer binaries (step 300) and matching the generated fingerprints to determine whether there is sufficient similarity (step 700). It should be recognized that fingerprint generation from compiled computer binaries that are later compared for matching can be performed at approximately the same time or can be performed at different times. For example, a fingerprint of a first compiled computer binary can be generated for purposes of identifying theft of the underlying code. Other compiled computer binaries can then be collected over a period of time, and then fingerprints can be generated using the other compiled computer binaries for comparison with the first compiled computer binaries. These other compiled computer binaries can be obtained in any manner, such as, for example, using a web spider that crawls across the Internet and collects compiled computer binaries. The other compiled computer binaries can also be manually input. For example, the owner of a first compiled computer binary may suspect that a second compiled computer binary contains code stolen from the first compiled computer binary. In this case, the fingerprints can be generated from the first and second compiled computer binaries at approximately the same time and then compared using the inventive fingerprint matching technique.

Figure 2:
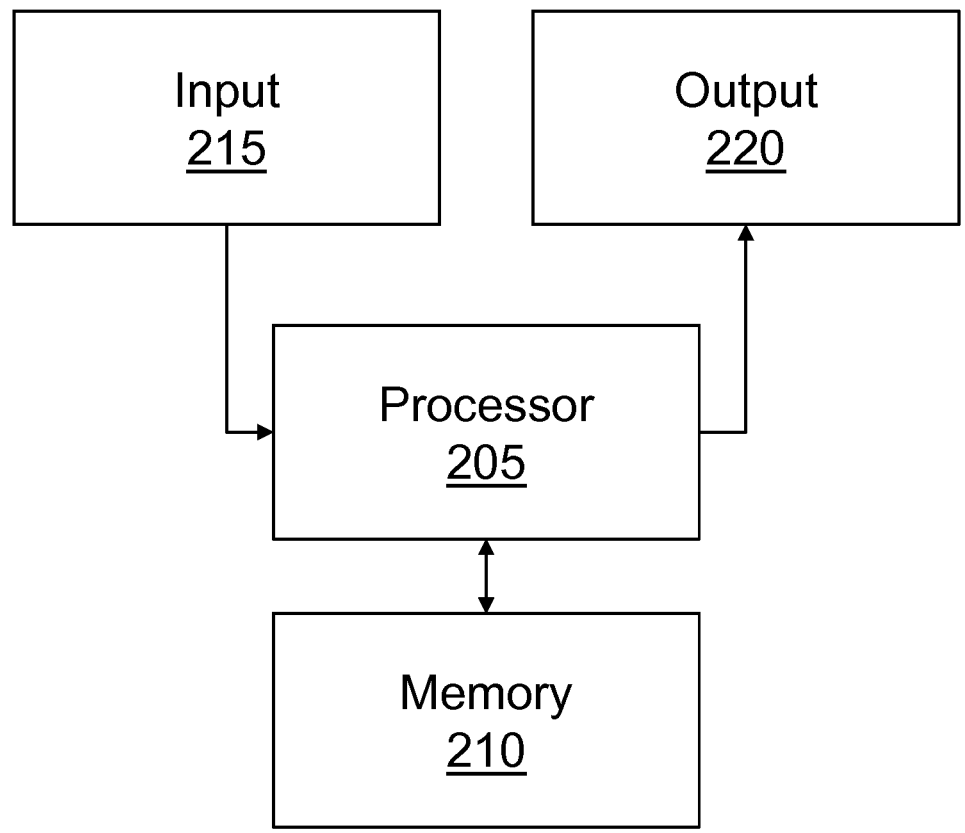
FIG. 2 is a block diagram of an exemplary system for generating and matching fingerprints in accordance with the present invention.

FIG. 2 is a block diagram of an exemplary system for generating and matching fingerprints in accordance with the present invention. The system 200 can comprise one or more computers that include a processor 205 coupled to memory 210, input 215, and output 220. The disclosed processes can be performed by processor 205 executing computer code stored in memory 210. The processor 205 can be any type of processor, including a microprocessor, field programmable gate array (FPGA), and/or an application specific integrated circuit (ASIC). Memory 210 can be any type of non-transitory memory. In addition to storing computer code for executing the processes described herein, memory 210 can also store the generated fingerprints. Alternatively or additionally, a separate storage medium can store the generated fingerprints. For example, the computer binaries, fingerprints, and comparison scores can be stored in a distributed file system and non-relational, distributed database. Input 215 provides mechanisms for controlling the disclosed processes, including, for example, a keyboard, mouse, trackball, trackpad, touchscreen, etc. Further, input 215 can include a connection to an external storage device for providing compiled computer binaries, such as an external hard drive or flash storage memory, as well as a network connection. Output 220 can include a display, printer, and/or the like. Additionally, output 220 can include a network connection for notifying an owner of a compiled computer binary of any identified potential infringement, such as by electronic mail, posting on a website or webpage, a text message, and/or the like.

Figure 3:
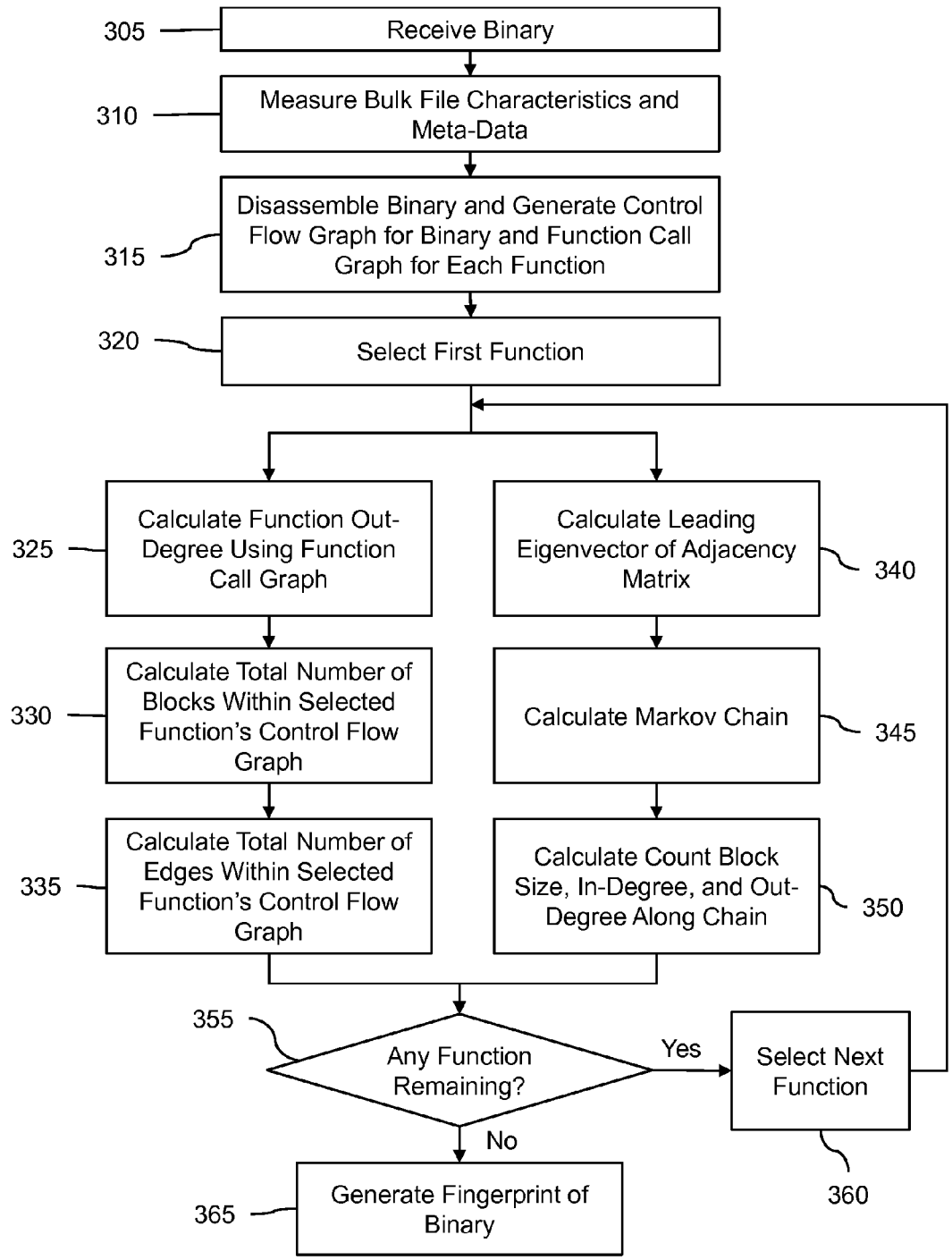
FIG. 3 is a flow diagram of an exemplary process for generating a fingerprint using binary code in accordance with the present invention.

FIG. 3 is a flow diagram of an exemplary process for generating a fingerprint using binary code in accordance with the present invention. This process is performed using the system of FIG. 2. Initially, processor 205 receives a compiled computer binary (step 305) via input 215 and/or memory 210 and measures bulk file characteristics and meta-data (step 310). Next, processor 205 disassembles the compiled computer binary, generates a control flow graph from the disassembled binary, and generates function call graphs for each function in the control flow graph (step 315). Once the compiled computer binary is disassembled, the remainder of the processing can be performed independent of the particular language, operating system, or architecture that the code was written for.

Figure 4:
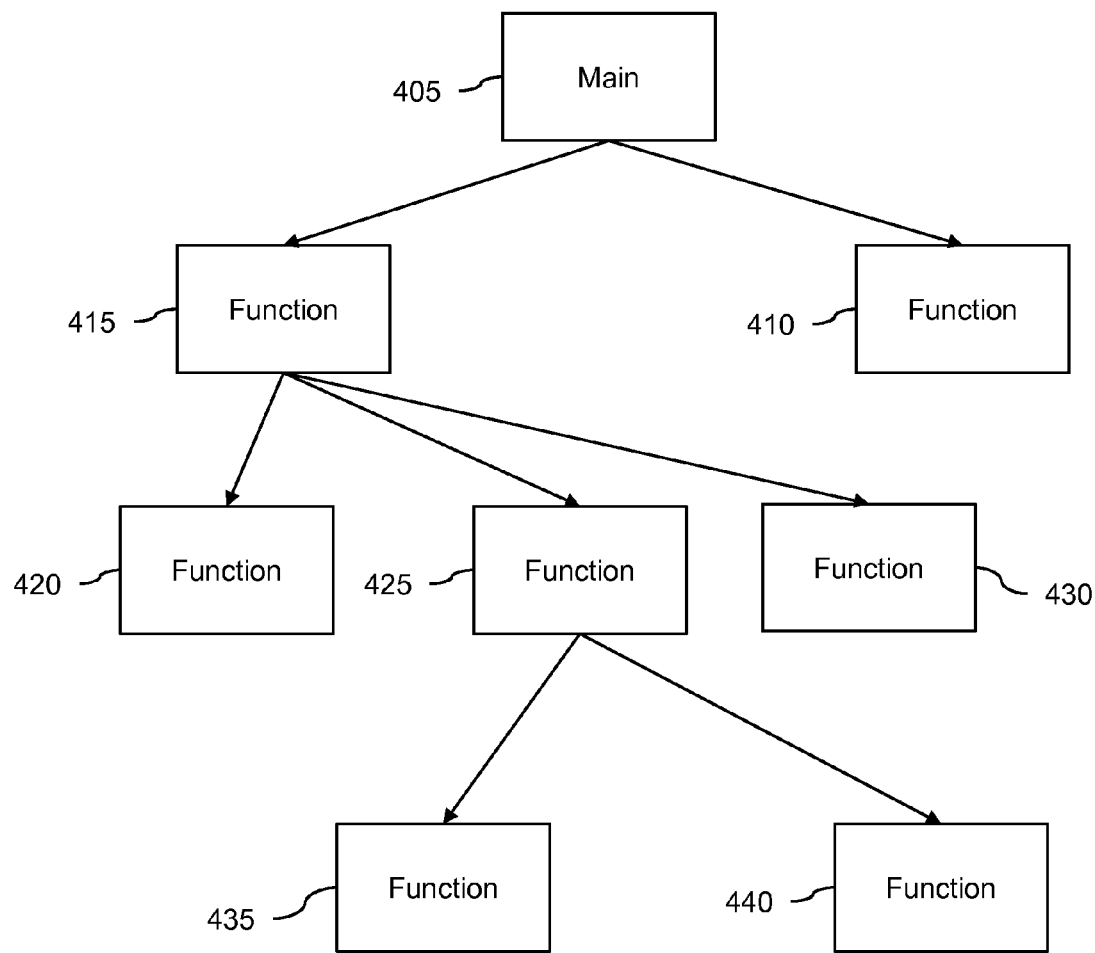
FIG. 4 is a block diagram of an exemplary call graph in accordance with the present invention.

FIG. 4 is a block diagram of an exemplary call graph in accordance with the present invention. As will be appreciated by those skilled in the art, a call graph describes the relationship between various functions in a compiled binary. Thus, in FIG. 4, a main function 405 (also commonly referred to as a routine) has calls to sub-functions 410 and 415 (also commonly referred to as sub-routines). In turn, function 415 has calls to functions 420, 425, and 430, and function 425 has calls to functions 435 and 440. Those skilled in the art will recognize that in a call graph each function is commonly referred to as a node and the connections between functions are commonly referred to as edges. It will be recognized that the call graph of FIG. 4 is a highly simplified graph and that compiled computer binaries typically will be disassembled into much more extensive call graphs.

Figure 5:
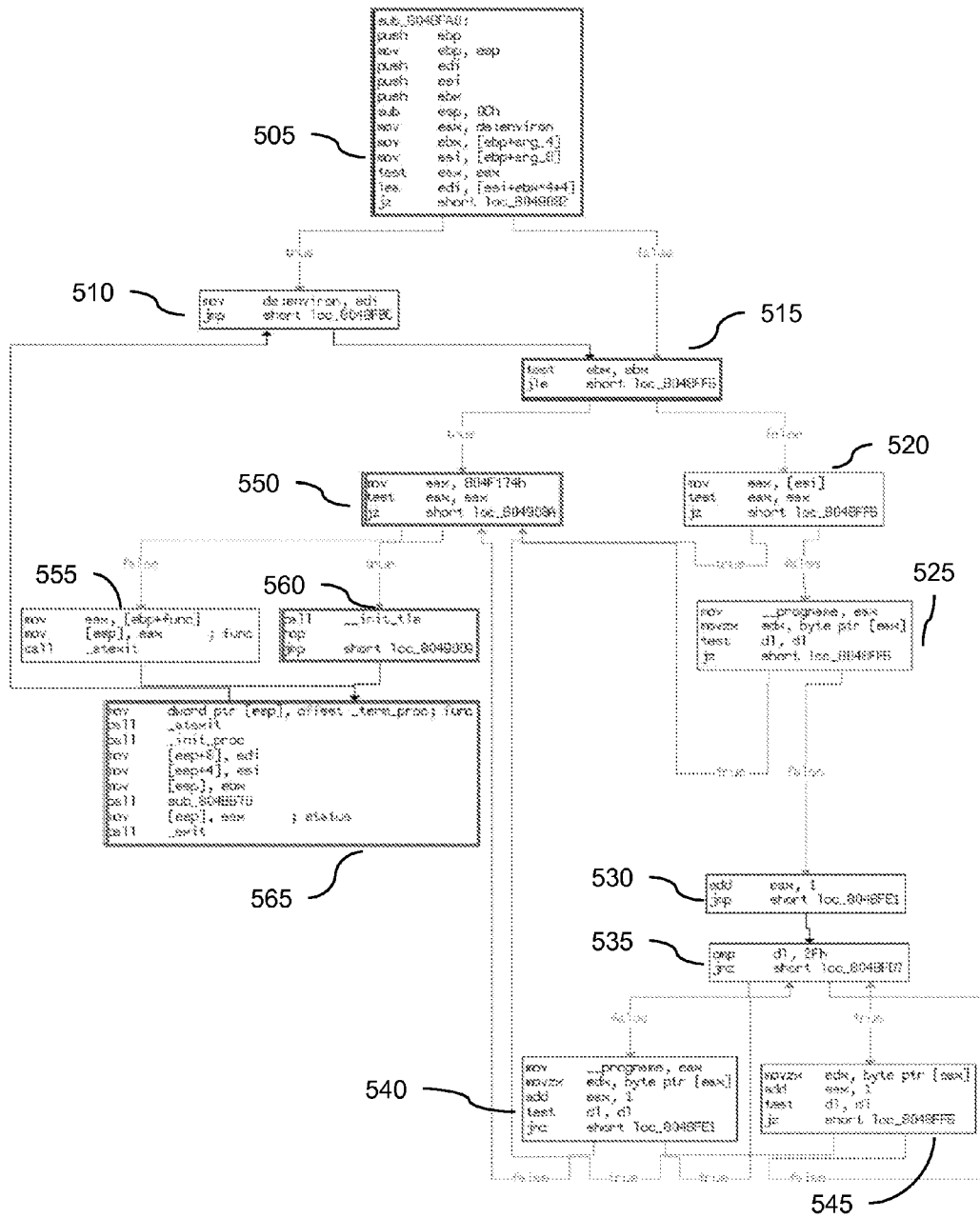
FIG. 5 is a block diagram of an exemplary control flow graph in accordance with the present invention.

FIG. 5 is a block diagram of an exemplary control flow graph in accordance with the present invention. Those skilled in the art will recognize that a control flow graph for a function describes all possible paths that may be traversed during execution of the particular function. Examples of paths that may be executed in the function of FIG. 5 include blocks 505, 515, 520, 525, 530, 535, and 545; 505, 515, 520, 525, 530, 535, 540, 550, 560, and 565; 505, 510, 515, 550, 560, and 565; and 505, 510, 515, 550, 555, and 565. In addition to these paths, any path with connections illustrated in FIG. 5 can be traversed during the execution of the function. Further, it should be recognized that this is merely an exemplary function and that other functions are within the scope of the invention.

Returning to FIG. 3, after processor 205 generates the control flow graphs for each function (step 315), processor 205 selects one of the functions for processing (step 320). As illustrated, this processing is performed along two parallel paths. It should be recognized, however, that these two paths can be performed serially, if desired. It should also be recognized that this parallel processing does not require all of the control flow graphs to be generated, and accordingly this parallel processing can be performed as control flow graphs are generated. Turning to the path on the left-hand side of FIG. 3, first processor 205 calculates the function out-degree using the call graph for the particular function (step 325). The function out-degree represents the number of paths or calls from a particular function to other functions in the call graph. Next processor 205 calculates the total number of blocks within the selected function's control flow graph (step 330), and finally processor 205 calculates the total number of edges within the selected function's control flow graph (step 335). The edges in the control flow graph are the connections between the different blocks within this graph.

Turning now to the path on the right-hand side of FIG. 3, first processor 205 calculates the leading Eigenvector of the adjacency matrix (step 340). The adjacency matrix is comprised of the function coordinates 620 (described below in connection with FIG. 6). Next, processor 205 calculates the Markov chain (step 345). The Markov chain is calculated starting with the leading Eigenvector and then appending connected nodes corresponding with successively smaller elements of the leading Eigenvector. The Markov chain provides a good low-rank approximation, or serialization, of the control flow graph that is relatively unique and particularly well-suited for further statistical analysis of the control flow graph.

Processor 205 then calculates count block size, in-degree, and out-degree along the Markov chain (step 350). These three spectra are relatively unique among and within compiled computer binaries. An example of the count block size, in-degree, and out-degree will now be described in connection with FIG. 5, and assuming a chain between the blocks as follows: 505=>515=>550=>560=>565. In this example the block count spectrum would be [12, 2, 3, 3, 9] because block 505 has 12 instructions, block 515 has two instructions, blocks 550 and 560 each have three instructions, and block 565 has nine instructions. The in-degree spectrum would be [0, 2, 3, 1, 2] because block 505 does not have any incoming edges, block 515 has two incoming edges, block 550 has three incoming edges, block 560 has one incoming edge, and block 565 has two incoming edges. The out-degree spectrum would be [2, 2, 2, 1, 1] because blocks 505, 515, and 550 each have two outgoing edges and blocks 560 and 565 each have two outgoing edges. The values for each spectra and ordering of values provides a unique signature for a particular control flow graph that can be used to identify other functions that have the same or similar unique signatures.

After the processing of the two parallel paths is complete, processor 205 determines whether there are any further functions to process (step 355). If there are ("Yes" path out of decision step 355), then the next function is selected (step 360) and the parallel processing is repeated. If not ("No" path out of decision step 355), then processor 205 generates the fingerprint of the binary using the calculated information (step 365).

FIG. 6 is a block diagram of an exemplary fingerprint in accordance with the present invention. As illustrated in FIG. 6, the fingerprint includes bulk file characteristics and meta-data 610, function coordinates 620, and unique spectra 630. The function coordinates 620 includes, for each function, the calculated out-degree, number of blocks, and number of edges. The unique spectra includes, for each function, the calculated block size, in-degree, and out-degree. These fingerprints are then used for comparison against fingerprints of other compiled computer binaries as described below in connection with FIGS. 7A and 7B.

Figure 7A:
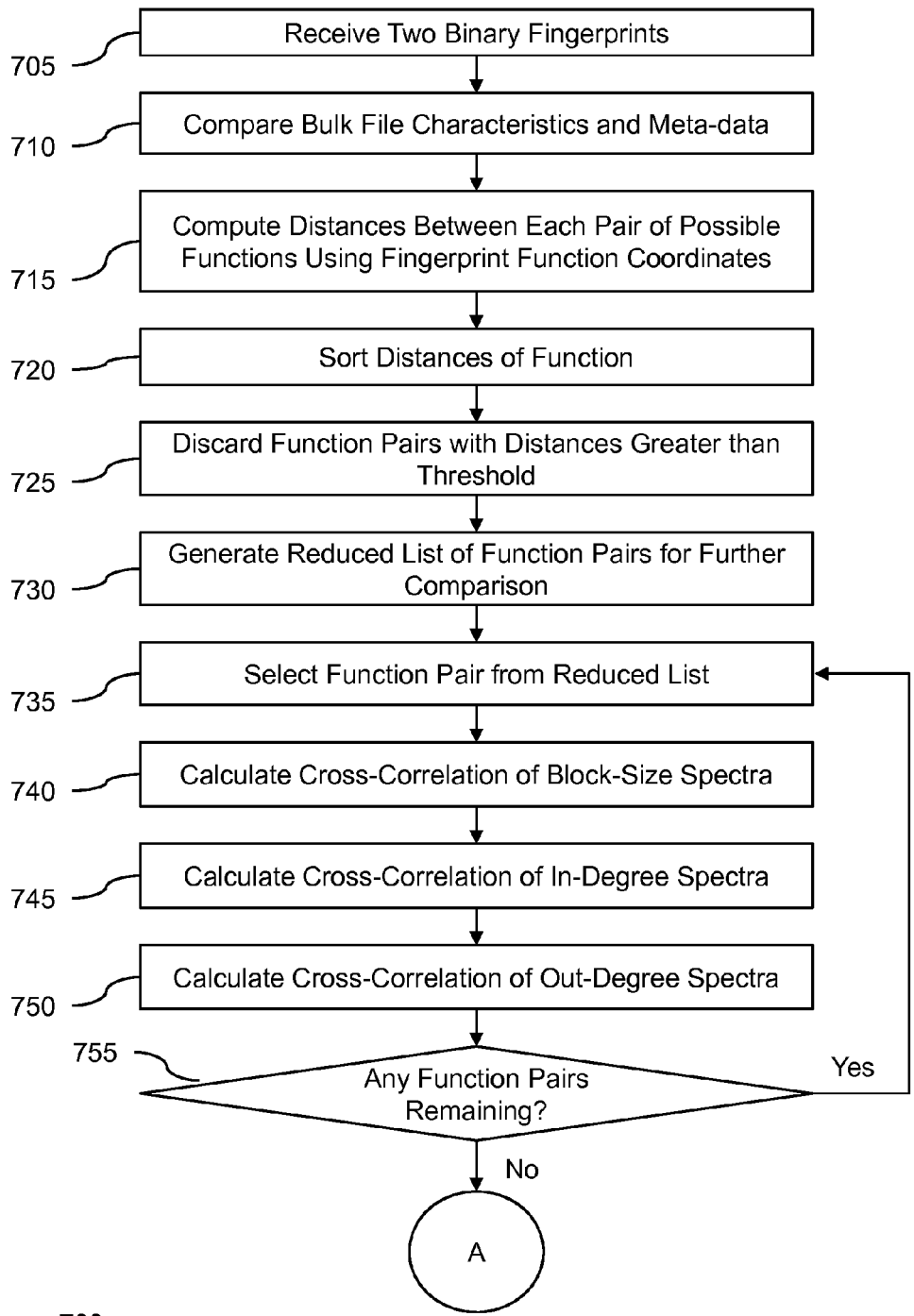
FIGS. 7A and 7B are flow diagrams of an exemplary process for matching fingerprints in accordance with the present invention.
Figure 7B:
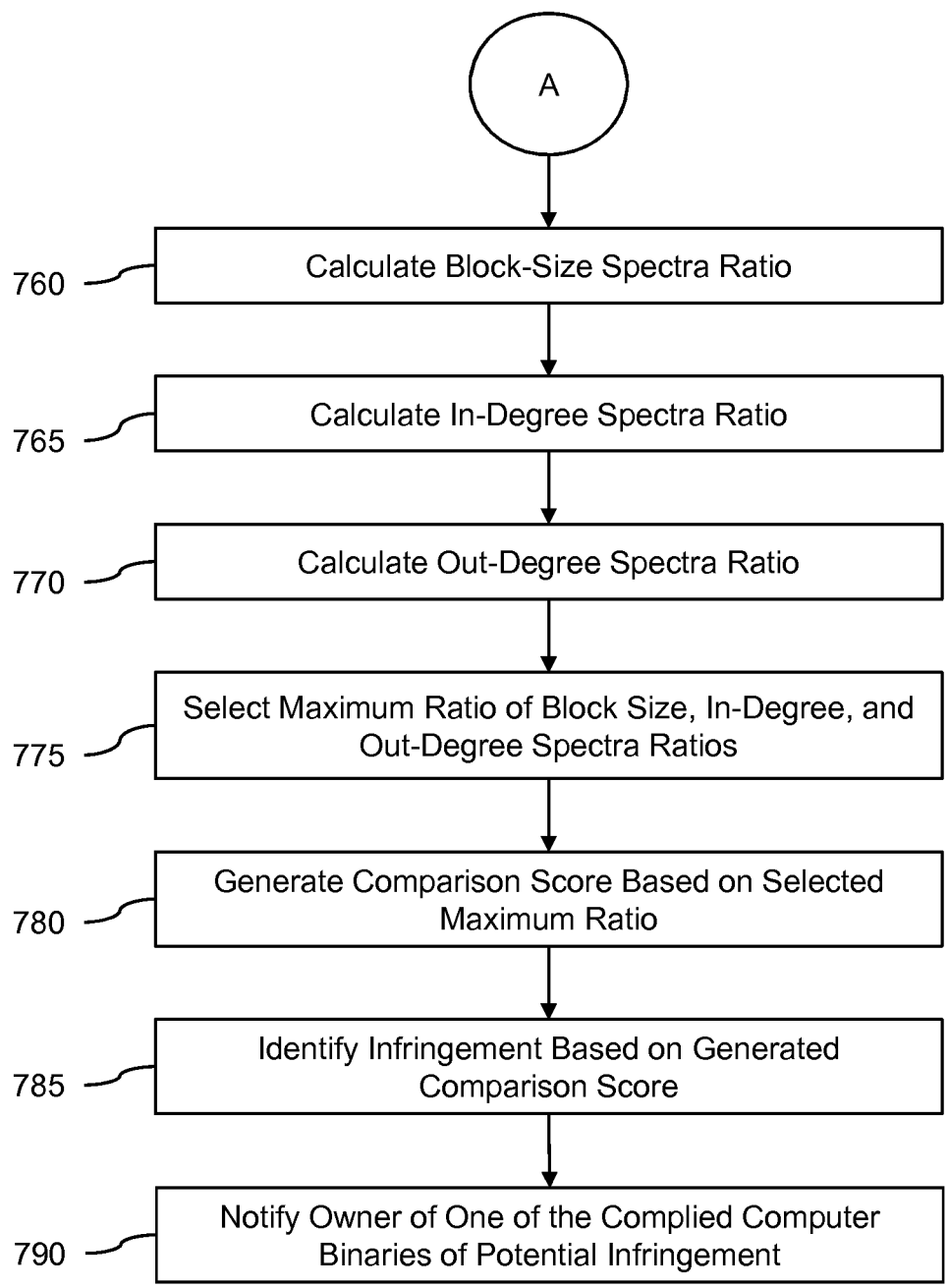

FIGS. 7A and 7B are flow diagrams of an exemplary process for matching fingerprints in accordance with the present invention. This process is performed using the system of FIG. 2. Initially, processor 205 receives two fingerprints of compiled computer binaries via input 215 and/or memory 210 (step 705) and compares their bulk file characteristic and meta-data (step 710). The bulk file characteristic can include measuring the Jaccard Similarity, which is a numerical score representing the amount of overlap between strings contained in both fingerprints, and is typically between 0 and 1.

Next, processor 205 computes distances between each pair of possible functions of the two fingerprints using the function coordinates 620 of the respective fingerprints (step 720). Processor 205 then sorts the distances sorted (step 720) and discards function pairs having distances greater than a threshold distance (step 725). This step reduces the processing load because only the most-likely related functions will have distances below the threshold. Thus, the particular threshold value can be selected depending upon the available processing power of the computer and the desired run-time of the fingerprint comparison process. Furthermore, those skilled in the art will recognize that above a certain distance it is highly unlikely that functions will be related, and thus at least some thresholding should be performed to reduce unnecessary processing.

Processor 205 then generates a list using the remaining function pairs (step 730), and one of the function pairs from the reduced list is selected for further processing of the unique spectra 630 (step 735). Specifically, processor 205 calculates a cross-correlation for the block-size spectra (step 740), the in-degree spectra (step 745), and the out-degree spectra (step 750). It will be recognized that the cross-correlation is a measure of how closely the spectra of the two fingerprints are related. Next processor 205 determines whether any function pairs remain to be processed (step 755). If so ("Yes path out of decision step 755), then the next function pair is selected from the reduced list (step 735) and the cross-correlation of the unique spectra are calculated (steps 740-750). The cross-correlation can produce a correlation coefficient indicating the degree of similarity or correlation. For example, a coefficient of −1 indicates complete anti-correlation and 1 indicates complete correlation (i.e., the two fingerprints have the same control flow graph).

If there are no remaining function pairs to process ("No" path out of decision step 755), then processor 205 calculates a block-size, in-degree and out-degree spectra ratios (step 760-770). These ratios are calculated by dividing a total number of respective correlation coefficients above a threshold by a total number of correlation coefficients. The threshold used for the calculation of the three ratios can be the same or different. Processor 205 then selects the maximum ratio of the unique spectra ratios (step 775) and generates a comparison score based on the selected maximum ratio (step 780). The generated comparison score is then used by processor 205 to identify infringement of one of the compiled computer binaries (step 785). The comparison score is generated by comparing the selected maximum ratio of the unique spectra ratios to a threshold, and accordingly infringement is identified when the selected maximum ratio is above the threshold. The threshold can be set, for example, by training the system using known data and a particular compiled computer binary for which it is to be determined whether there are other compiled computer binaries infringing the particular compiled computer binary. This training identifies commonalities between the known data and the particular compiled computer binary so that the threshold can be set to avoid false positives indicating infringement due to code commonly used across different pieces of software that would not be an indicator of infringement.

When, based on the generated comparison score, there is sufficient similarity between the compiled computer binaries or portions of the compiled computer binaries, processor 205 can notify the owner of one of the compiled computer binaries of the potential infringement via output 220 (step 790). The notification can include details of the regions of the allegedly infringing computer binary that is most likely involved in the infringement.

The collection of compiled computer binaries, fingerprint generation, and fingerprint matching can be automated and scheduled to execute using any type of task scheduling technique. Thus, the present invention provides a particularly cost- and time-effective way to discover, remediate, and enforce intellectual property rights, and accordingly acts as a deterrence against the theft of software code. Further, by identifying infringement based on the functions contained within compiled computer binaries, the present invention can identify an entirely copied compiled computer binary, as well as copied portions of a compiled computer binary.

Although exemplary embodiments have been described above as generating fingerprints using compiled computer binaries, the present invention is equally applicable to computer source code, byte code, and the like.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method comprising:

receiving, by a computer, a first compiled computer binary;

disassembling, by the computer, the first complied computer binary into a form independent of programming language, operating system and architecture for which the first compiled computer binary was written;

generating, by the computer, a first fingerprint of the first compiled computer binary using the disassembled first compiled computer binary;

receiving, by the computer, a second compiled computer binary;

generating, by the computer, a second fingerprint of the second compiled computer binary;

comparing, by the computer, the first fingerprint of the first compiled computer binary with the second fingerprint of the second compiled computer binary; and determining, by the computer, whether at least some of the first compiled computer binary is present in the second compiled computer binary based on the comparison, wherein the generation of the first fingerprint of the first compiled computer binary comprises generating, by the computer, a call graph using the disassembled first compiled computer binary, wherein the call graph describes relationships between functions and sub-functions in the disassembled first compiled computer binary;

generating, by the computer, a control flow graph for each of a plurality of functions in the call graph, wherein the control flow graph describes all possible paths that may be traversed during execution of each of the plurality of functions in the call graph;

selecting, by the computer, one of the plurality of functions;

calculating, by the computer for the selected one of the plurality of functions, a leading Eigenvector of an adjacency matrix of the selected function's control flow graph;

generating, by the computer for the selected one of the plurality of functions, an edge-connected path starting from a node corresponding to a largest element in the leading Eigenvector of the adjacency matrix and appending connected nodes corresponding to successively smaller elements of the leading Eigenvector; and calculating, by the computer for the selected one of the plurality of functions, unique spectra of the control flow graph for the selected function using the generated edge-connected path.

2. The method of claim 1, wherein the generation of the first fingerprint of the first compiled computer binary further comprises:

selecting, by the computer, one of the plurality of functions;

calculating, by the computer for the selected one of the plurality of functions
 a function out-degree using the call graph;
 a total number of blocks within the selected function's control flow graph; and
 a total number of edges within the selected function's control flow graph.

3. The method of claim 1, wherein the unique spectra are count block size, in-degree, and out-degree along the edge-connected path.

4. The method of claim 1, wherein the generation of the first fingerprint of the first compiled computer binary comprises:

measuring, by the computer, bulk file characteristics and meta-data from the first compiled computer binary.

5. The method of claim 1, wherein the second compiled computer binary is collected using a spider that crawls across websites on the Internet.

6. The method of claim 1, wherein the method determines that the second compiled computer binary infringes the first compiled computer binary when the at least some of the first compiled computer binary is present in the second compiled computer binary but not all of the first compiled computer binary is present in the second compiled computer binary.

7. A method comprising:

receiving, by a computer, a first compiled computer binary;

disassembling, by the computer, the first compiled computer binary into a form independent of programming language, operating system and architecture for which the first compiled computer binary was written;

generating, by the computer, a first fingerprint of the first compiled computer binary using the disassembled first compiled computer binary;

receiving, by the computer, a second compiled computer binary;

generating, by the computer, a second fingerprint of the second compiled computer binary;

comparing, by the computer, the first fingerprint of the first compiled computer binary with the second fingerprint of the second compiled computer binary; and determining, by the computer, whether at least some of the first compiled computer binary is present in the second compiled computer binary based on the comparison, wherein the comparison of the first fingerprint of the first compiled computer binary with the second fingerprint of the second compiled computer binary comprises
 computing, by the computer, distances between each pair of possible functions of the first and second compiled computer binaries;
 selecting, by the computer, a subset of the pairs of possible functions; and
 calculating, by the computer, a cross-correlation of unique spectra for each pair of functions of the subset of pairs of possible functions, wherein the unique spectra are count block size, in-degree, and out-degree along the edge-connected path, wherein the cross-correlation of unique spectra produces, for each pair of functions of the subset of pairs of possible function
 a block size correlation coefficient;
 an in-degree correlation coefficient; and
 an out-degree correlation coefficient.

8. The method of claim 7, wherein the determination of whether at least some of the first compiled computer binary is present in the second compiled computer binary comprises:

calculating, by the computer, a block size ratio by dividing a number of block size correlation coefficients above a first threshold by a total number of block size correlation coefficients;

calculating, by the computer, an in-degree ratio by dividing a number of in-degree correlation coefficients above a second threshold by a total number of in-degree correlation coefficients;

calculating, by the computer, an out-degree ratio by dividing a number of out-degree correlation coefficients above a third threshold by a total number of out-degree correlation coefficients;

selecting, by the computer, one of the block size, in-degree, and out-degree ratios having a highest value; and comparing, by the computer, the selected one of the block size, in-degree, and out-degree ratios having the highest value with a fourth threshold.

9. The method of claim 8, wherein the first, second, and third thresholds are the same.

10. The method of claim 8, wherein the first, second, and third thresholds are different.

11. The method of claim 7, wherein the generation of the first fingerprint of the first compiled computer binary comprises:

measuring, by the computer, bulk file characteristics and meta-data from the first compiled computer binary.

12. The method of claim 7, wherein the second compiled computer binary is collected using a spider that crawls across websites on the Internet.

13. The method of claim 7, wherein the method determines that the second compiled computer binary infringes the first compiled computer binary when the at least some of the first compiled computer binary is present in the second compiled computer binary but not all of the first compiled computer binary is present in the second compiled computer binary.

14. A system comprising:

an input configured to receive a first and second compiled computer binary;

a microprocessor coupled to the input to receive the first and second compiled computer binaries, wherein the microprocessor is configured to
 disassemble the first compiled computer binary into a form independent of programming language, operating system and architecture for which the first compiled computer binary was written;

generate a first fingerprint of the first compiled computer binary using the disassembled first computer binary;

generate a second fingerprint of the second compiled computer binary;

compare the first fingerprint of the first compiled computer binary with the second fingerprint of the second compiled computer binary; and determine whether at least some of the first compiled computer binary is present in the second compiled computer binary based on the comparison; and an output coupled to the microprocessor, wherein the output is configured to output an indication of whether at least some of the first compiled computer binary is present in the second compiled computer binary, wherein the configuration of the microprocessor to generate the first fingerprint of the first compiled computer binary involves the microprocessor being configured to generate a call graph using the disassembled first compiled computer binary, wherein the call graph describes relationships between functions and subfunctions in the disassembled first compiled computer binary;

generate a control flow graph for each of a plurality of functions in the call graph, wherein the control flow graph describes all possible paths that may be traversed during execution of each of the plurality of functions in the call graph, select one of the plurality of functions;

calculate, for the selected one of the plurality of functions, a leading Eigenvector of an adjacency matrix of the selected function's control flow graph;

generate, for the selected one of the plurality of functions, an edge-connected path starting from a node corresponding to a largest element in the leading Eigenvector of the adjacency matrix and appending connected nodes corresponding to successively smaller elements of the leading Eigenvector; and calculate, for the selected one of the plurality of functions, unique spectra of the control flow graph for the selected function using the generated edge-connected path.

15. The system of claim 14, wherein the configuration of the microprocessor to generate the first fingerprint of the first compiled computer binary further involves the microprocessor being configured to:

select one of the plurality of functions;

calculate for the selected one of the plurality of functions a function out-degree using the call graph;

a total number of blocks within the selected function's control flow graph; and a total number of edges within the selected function's control flow graph.

16. The system of claim 14, wherein the unique spectra are count block size, in-degree, and out-degree along the edge-connected path.

17. The system of claim 14, wherein the configuration of the microprocessor to generate the first fingerprint of the first compiled computer binary involves the microprocessor being configured to:

measure bulk file characteristics and meta-data from the first compiled computer binary.

18. The system of claim 14, wherein the system is configured to collect the second compiled computer binary using a spider that crawls across websites on the Internet.

19. The system of claim 14, wherein the microprocessor determines that the second compiled computer binary infringes the first compiled computer binary when the at least some of the first compiled computer binary is present in the second compiled computer binary but not all of the first compiled computer binary is present in the second compiled computer binary.

20. A system comprising:

an input configured to receive a first and second compiled computer binary;

a microprocessor coupled to the input to receive the first and second compiled computer binaries, wherein the microprocessor is configured to disassemble the first complied computer binary into a form independent of programming language, operating system and architecture for which the first compiled computer binary was written;

generate a first fingerprint of the first compiled computer binary using the disassembled first computer binary;

generate a second fingerprint of the second compiled computer binary;

compare the first fingerprint of the first compiled computer binary with the second fingerprint of the second compiled computer binary; and determine whether at least some of the first compiled computer binary is present in the second compiled computer binary based on the comparison; and an output coupled to the microprocessor, wherein the output is configured to output an indication of whether at least some of the first compiled computer binary is present in the second compiled computer binary, wherein the configuration of the microprocessor to compare the first fingerprint of the first compiled computer binary with the second fingerprint of the second compiled computer binary involves the microprocessor being configured to compute distances between each pair of possible functions of the first and second compiled computer binaries;

select a subset of the pairs of possible functions; and calculate a cross-correlation of unique spectra for each pair of functions of the subset of pairs of possible functions, wherein the unique spectra are count block size, in-degree, and out-degree along the edge-connected path, wherein the cross-correlation of unique spectra produces, for each pair of functions of the subset of pairs of possible function a block size correlation coefficient;

an in-degree correlation coefficient; and an out-degree correlation coefficient.

21. The system of claim 20, wherein the configuration of the microprocessor to determine whether at least some of the first compiled computer binary is present in the second compiled computer binary involves the microprocessor being configured to:

calculate a block size ratio by dividing a number of block size correlation coefficients above a first threshold by a total number of block size correlation coefficients;

calculate an in-degree ratio by dividing a number of in-degree correlation coefficients above a second threshold by a total number of in-degree correlation coefficients;

calculate an out-degree ratio by dividing a number of out-degree correlation coefficients above a third threshold by a total number of out-degree correlation coefficients;

select one of the block size, in-degree, and out-degree ratios having a highest value; and compare the selected one of the block size, in-degree, and out-degree ratios having the highest value with a fourth threshold.

22. The system of claim 21, wherein the first, second, and third thresholds are the same.

23. The system of claim 21, wherein the first, second, and third thresholds are different.

24. The system of claim 20, wherein the configuration of the microprocessor to generate the first fingerprint of the first compiled computer binary involves the microprocessor being configured to:
   measure bulk file characteristics and meta-data from the first compiled computer binary.

25. The system of claim 20, wherein the system is configured to collect the second compiled computer binary using a spider that crawls across websites on the Internet.

26. The system of claim 20, wherein the microprocessor determines that the second compiled computer binary infringes the first compiled computer binary when the at least some of the first compiled computer binary is present in the second compiled computer binary but not all of the first compiled computer binary is present in the second compiled computer binary.

* * * * *